US011887237B2

(12) United States Patent
Mourkogiannis et al.

(10) Patent No.: US 11,887,237 B2
(45) Date of Patent: *Jan. 30, 2024

(54) DYNAMIC COMPOSITE USER IDENTIFIER

(71) Applicant: Snap Inc., Santa Monica, CA (US)

(72) Inventors: Celia Nicole Mourkogiannis, Los Angeles, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 17/131,479

(22) Filed: Dec. 22, 2020

(65) Prior Publication Data

US 2021/0110592 A1 Apr. 15, 2021

Related U.S. Application Data

(63) Continuation of application No. 16/203,314, filed on Nov. 28, 2018, now Pat. No. 10,902,661.

(51) Int. Cl.
*G06T 13/80* (2011.01)
*H04L 51/043* (2022.01)
*H04L 51/216* (2022.01)

(52) U.S. Cl.
CPC ............ *G06T 13/80* (2013.01); *H04L 51/043* (2013.01); *H04L 51/216* (2022.05)

(58) Field of Classification Search
CPC ..... G06T 13/80; G06T 2200/24; G06T 13/40; H04L 51/043; H04L 51/216;
(Continued)

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 109863532 A | 6/2019 |
| CN | 110168478 A | 8/2019 |

(Continued)

OTHER PUBLICATIONS

"U.S. Appl. No. 16/203,314, Examiner Interview Summary dated Jan. 28, 2020", 3 pgs.

(Continued)

*Primary Examiner* — Maurice L. McDowell, Jr.
(74) *Attorney, Agent, or Firm* — Schwegman Lundberg & Woessner, P.A.

(57) ABSTRACT

A system to dynamically generate and cause display of composite user identifiers is described. Embodiments of the present disclosure related to systems for: receiving an identification of a user profile from a client device; retrieving user identifiers associated with the user profile and a user profile associated with the client device; selecting an animation script from among a plurality of animation scripts, the animation script including a set of graphical elements; generating a composite user identifier based on the user identifiers associated with the user profile and the user profile associated with the client device; and causing display of a presentation of the composite user identifier at the client device, wherein the presentation is based on the animation script.

20 Claims, 11 Drawing Sheets

(58) Field of Classification Search
CPC ........ H04L 51/063; H04L 51/10; A63F 13/79; A63F 13/87; A63F 2300/5553; A63F 2300/6607
See application file for complete search history.

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,813,642 B1* | 11/2017 | Chen .................. H04N 1/00244 |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,902,661 B1* | 1/2021 | Mourkogiannis ....... G06T 13/40 |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0174872 A1* | 7/2007 | Jing .................. H04N 21/2665 725/35 |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0306655 A1 | 12/2010 | Mattingly et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0054646 A1* | 3/2012 | Hoomani ................ H04L 51/04 715/758 |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0145384 A1* | 6/2013 | Krum ............... H04N 21/44218 725/10 |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |

(56) References Cited

U.S. PATENT DOCUMENTS

| | | |
|---|---|---|
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0185581 A1 | 6/2017 | Bojja et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0005040 A1* | 1/2018 | Babenko ............... G06V 20/46 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0108286 A1* | 4/2019 | Pan ......................... G06F 16/50 |
| 2019/0188920 A1 | 6/2019 | Mcphee et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 16/203,314, Final Office Action dated Jun. 26, 2020".

"U.S. Appl. No. 16/203,314, Non Final Office Action dated Jan. 3, 2020", 27 pgs.

"U.S. Appl. No. 16/203,314, Notice of Allowance dated Sep. 16, 2020".

"U.S. Appl. No. 16/203,314, Response filed Apr. 3, 2020 to Non Final Office Action dated Jan. 3, 2020", 12 pgs.

"U.S. Appl. No. 16/203,314, Response filed Aug. 26, 2020 to Final Office Action dated Jun. 26, 2020", 11 pgs.

"Xtranormal tutorial", Youtube, [Online] Retrieved from the Internet: <URL: https://www.youtube.com/watch?v=DtWI-em0621>, (Jan. 24, 2010), 48 pgs.

Padhiyar, Jignesh, "How to Delete Snapchat Chat History on iPhone and iPad", www.igeeksblog.com/how-to-delete-snapchat-history-on-iphone-and-ipad/ on Jun. 22, 2020, (Mar. 14, 2017).

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Snapchat Support, "When does Snapchat delete Snaps and Chats?", retrieved from https://support.snapchat.com/en-US/article/when-are-snaps-chats-deleted on Jun. 22, 2020.

Stolberg, Emily, "How to Use Snapchat: The Complete Beginner's Guide", retrieved from https://learn.g2.com/how-to-use-snapchat on Jun. 22, 2020, (Aug. 1, 2018).

U.S. Appl. No. 16/203,314, filed Nov. 28, 2018, Dynamic Composite User Identifier.

* cited by examiner

600

ACCESSING A CHAT HISTORY BETWEEN THE FIRST USER ACCOUNT AND THE SECOND USER ACCOUNT IN RESPONSE TO THE RECEIVING THE IDENTIFICATION OF THE SECOND USER PROFILE FROM THE FIRST USER PROFILE
602

IDENTIFYING MEDIA CONTENT THAT COMPRISES THE ANIMATION SCRIPT AMONG A SET OF MESSAGES OF THE CHAT HISTORY
604

SELECTING THE ANIMATION SCRIPT FROM AMONG THE PLURALITY OF ANIMATION SCRIPTS IN RESPONSE TO THE IDENTIFYING THE MEDIA CONTENT THAT COMPRISES THE ANIMATION SCRIPT AMONG THE SET OF MESSAGES
606

FIG. 6

700
CAUSING DISPLAY OF THE PRESENTATION OF THE SECOND USER PROFILE THAT INCLUDES THE DISPLAY OF THE COMPOSITE IDENTIFIER
702
ANIMATING THE COMPOSITE IDENTIFIER BASED ON THE ANIMATION SCRIPT
704
*FIG. 7*

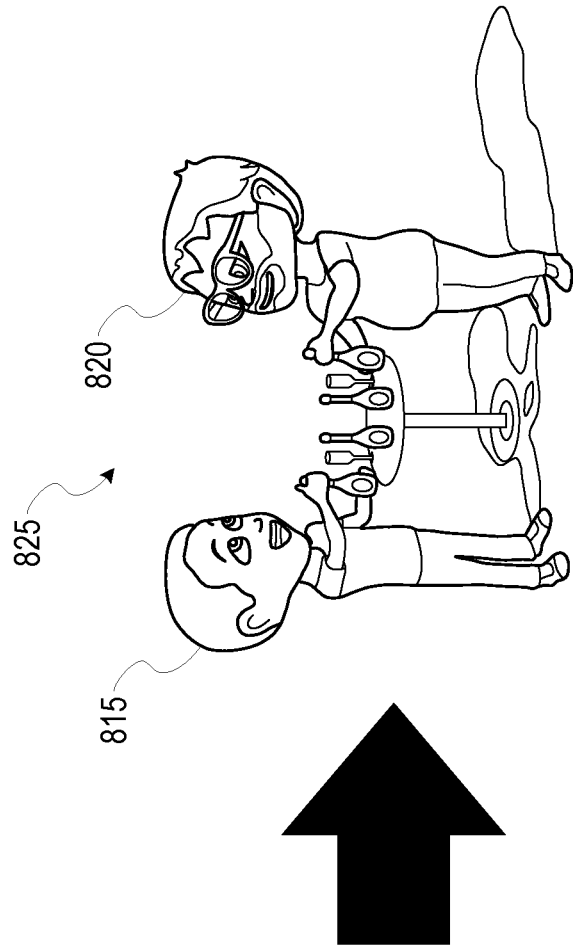
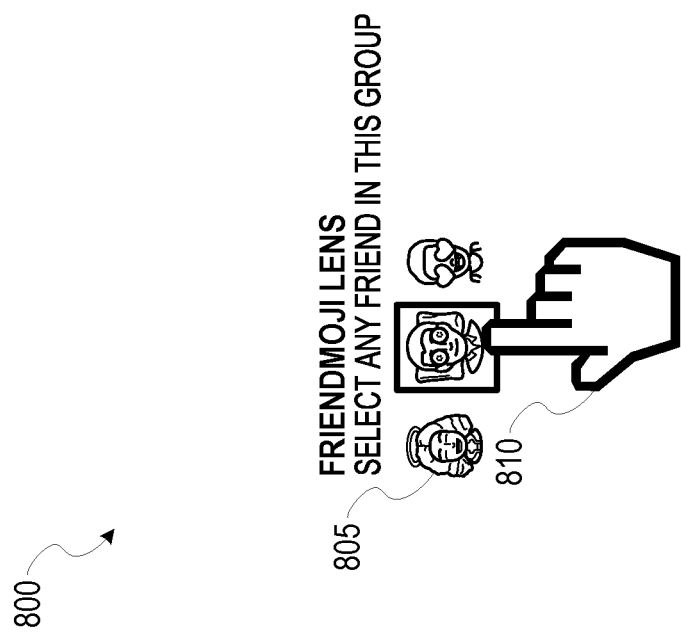
FIG. 8

DYNAMIC COMPOSITE USER IDENTIFIER

PRIORITY APPLICATION

This application claims priority to U.S. patent application Ser. No. 16/203,314, filed Nov. 28, 2018, the disclosure of which is incorporated herein in its entirety by reference.

TECHNICAL FIELD

Embodiments of the present disclosure relate generally to graphical user interfaces (GUI), and more particularly, to systems for generating and causing display of GUIs.

BACKGROUND

A user profile is a visual display of personal data associated with a specific user. The user profile may therefore refer to a digital representation of a person's identity. User profiles may therefore comprise a display of a user's personal avatar/identifier, as well as other information associated with the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 is a flowchart illustrating a method for generating and causing display of a dynamic composite user identifier, according to certain example embodiments.

FIG. 7 is a flowchart illustrating a method for generating and causing display of a dynamic composite user identifier, according to certain example embodiments.

FIG. 8 is a diagram illustrating a dynamic composite user identifier, according to certain example embodiments.

DETAILED DESCRIPTION

Figure 1:
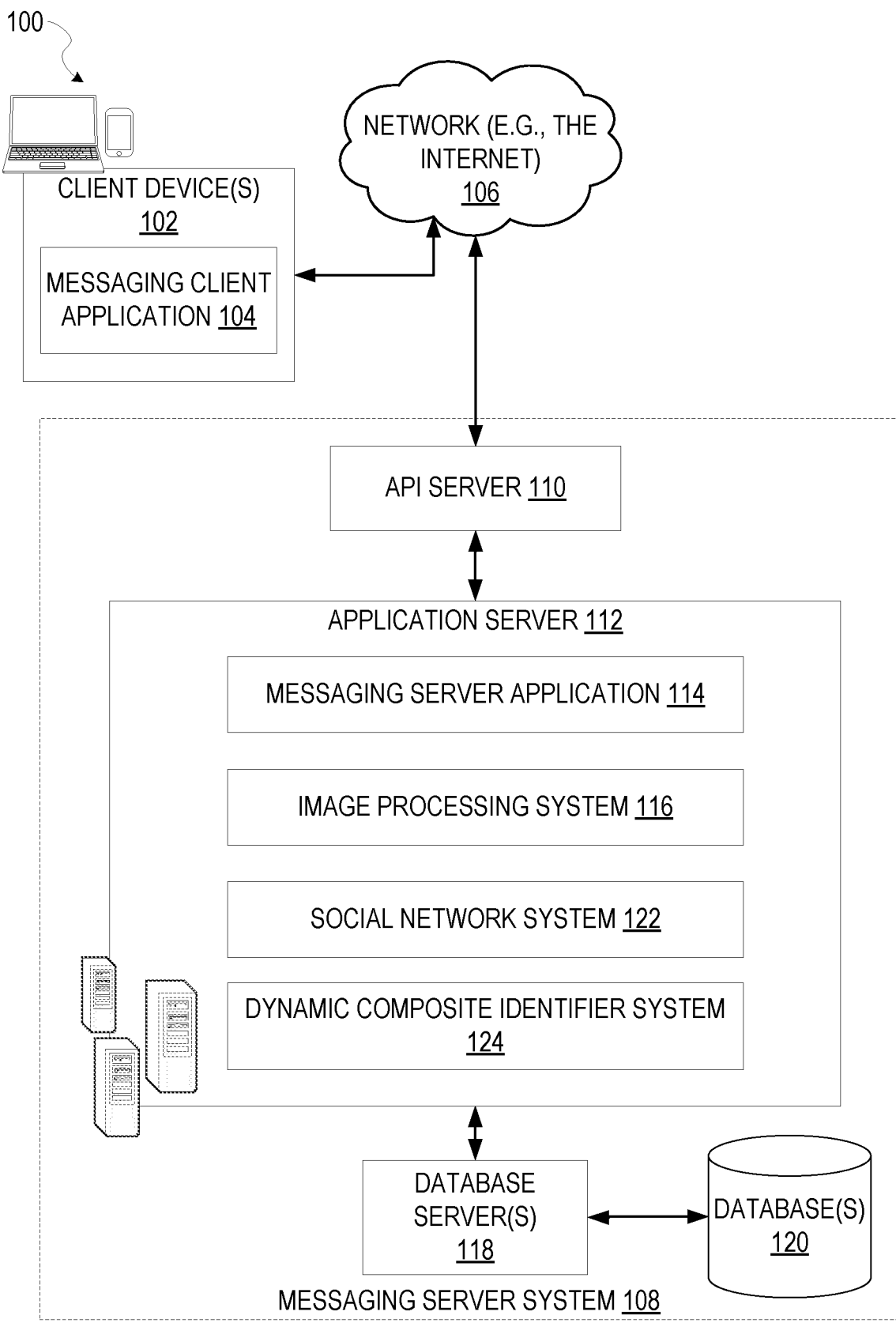
FIG. 1 is a block diagram showing an example messaging system for exchanging data (e.g., messages and associated content) over a network in accordance with some embodiments, wherein the messaging system includes a dynamic composite identifier system.

As discussed above, a user profile is a visual display of personal data associated with a specific user, and may therefore comprise a display of a user's personal avatar/identifier. The system disclosed below provides a system to dynamically generate customized avatars to be displayed within a portion of a user profile, where the customized avatar may be based on two distinct custom avatars. For example, a "first user" viewing a user profile of a "second user" may be presented with a customized avatar based on a first user identifier associated with the first user and a second user identifier associated with the second user. As discussed below, the customized "composite" avatars may be generated dynamically, and on-the-fly, based on various inputs received by the system. Some embodiments described below may additionally animate the customized composite avatars based on certain animation scripts, and further enable users to create media content based on the custom composite avatars.

Therefore, a system to dynamically generate and cause display of composite user identifiers is described. Embodiments of the present disclosure related to systems for: receiving an identification of a user profile from a client device; retrieving user identifiers associated with the user profile and a user profile associated with the client device; selecting an animation script from among a plurality of animation scripts, the animation script including a set of graphical elements; generating a composite user identifier based on the user identifiers associated with the user profile and the user profile associated with the client device; and causing display of a presentation of the composite user identifier at the client device, wherein the presentation is based on the animation script.

The user identifiers include graphical avatars, such as but not limited to "Bitmoji," wherein the graphical avatars may be customized or generated based on user preferences. For example, a user may personalize a graphical avatar to be associated with a corresponding user profile, such that the graphical avatar serves as a user identifier of the user.

According to certain example embodiments, an animation script may include a set of instructions that control actions and behaviors of objects, such as graphical avatars, display within a graphical user interface (GUI). For example, an animation script may define animation instructions that may cause a device to display a presentation of a graphical avatar associated with a user profile, wherein the presentation of the graphical avatar is animated to perform an action (e.g., dancing, waving, running), based on the animation instructions. The animation instructions may additionally include an associated set of graphical elements to be presented in conjunction with an animation of a graphical avatar.

Accordingly, a dynamic composite identifier system may maintain a database of animation scripts, and may select one or more animation scripts from among the database of animation scripts in response to receiving requests to display graphical avatars from client devices. For example, responsive to receiving a request to display a user profile, the dynamic composite identifier system retrieves an animation script from among the database of animation scripts, and causes display of a user identifier (e.g., a graphical avatar) associated with the user profile based on a texture map of the user identifier and the animation script.

In some embodiments, the animation script may be selected based on a number of factors related to the request itself, a usage history associated with the animation scripts, as well as user profile information. For example, the dynamic composite identifier may curate a collection of animation scripts from among the plurality of animation scripts based on the user profile information, in order to generate and display composite identifiers.

As an illustrative example, a first user may request to view a user profile associated with a second user. In response to receiving the request, the dynamic composite identifier system retrieves user identifiers of both the first and second user, as well as animation instructions, and generates a composite avatar to represent a relationship between the first and second user. The dynamic composite identifier system may then cause display of a user profile page of the second user, wherein the user profile page of the second user includes a display of a presentation of the composite identifier, and wherein the composite identifier is animated based on the animation instructions. For example, the composite identifier may perform an animation a single time, responsive to a user input, or looping.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a dynamic composite identifier system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
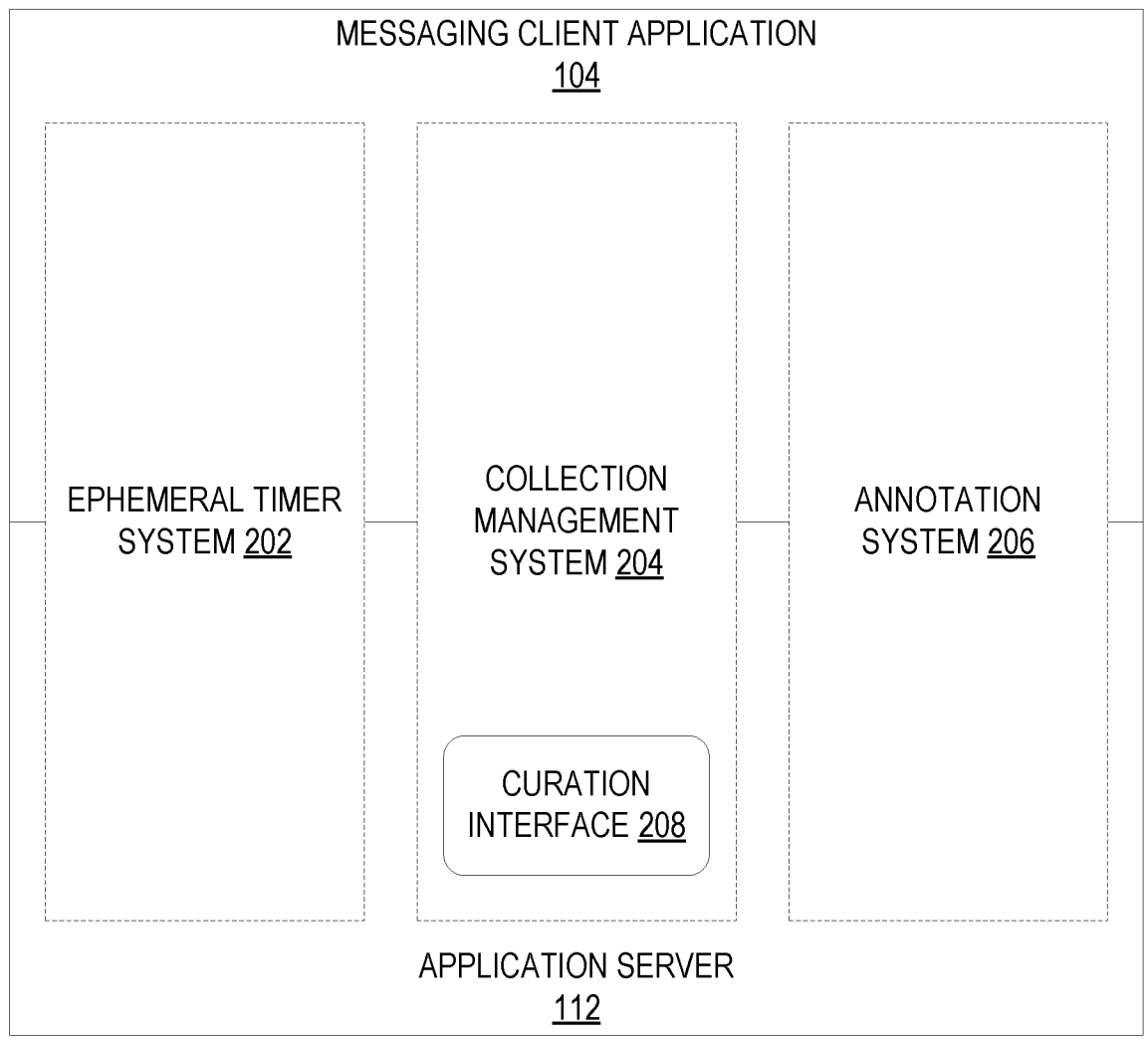
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
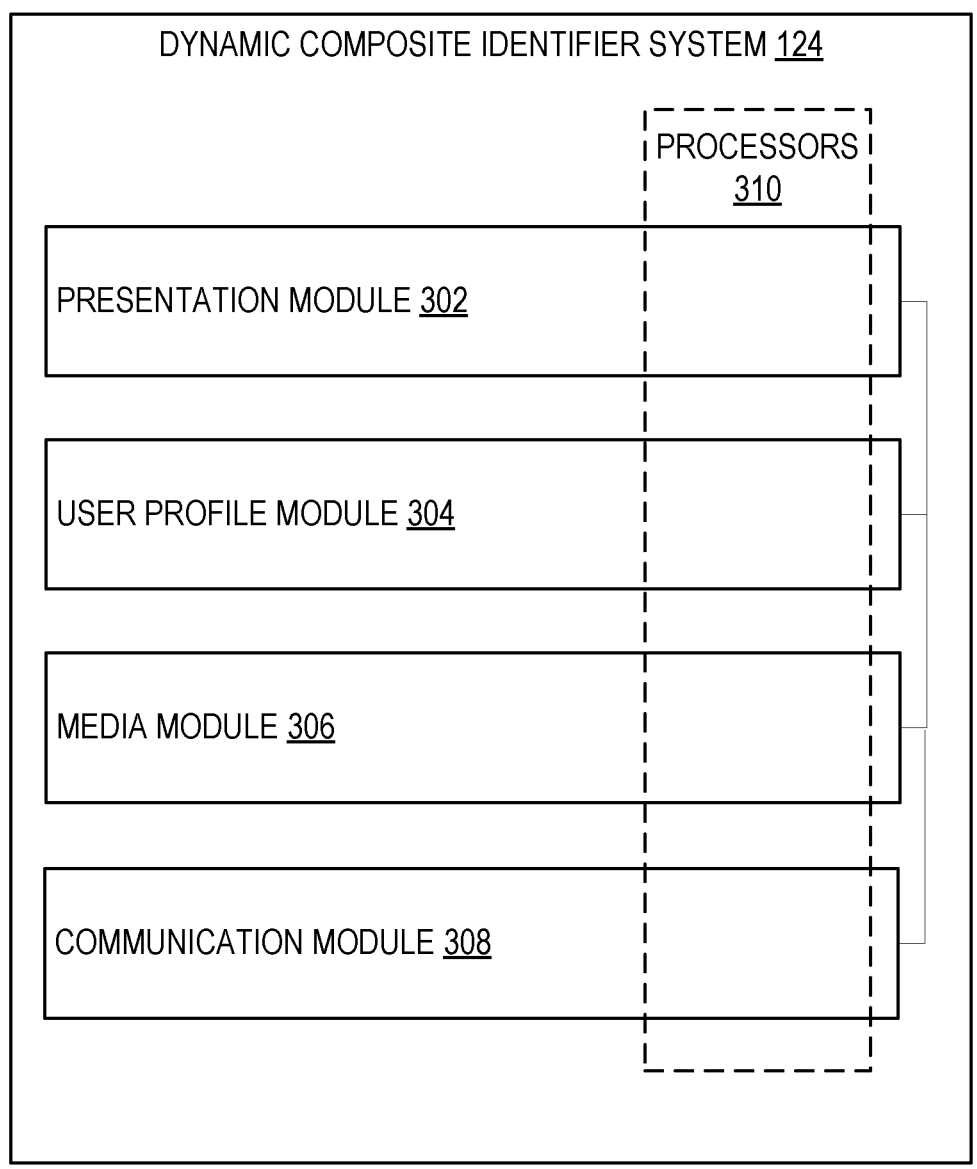
FIG. 3 is a block diagram illustrating various modules of a dynamic composite identifier system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the dynamic composite identifier system 124 that configure the dynamic composite identifier system 124 to generate and cause display of a dynamic composite user identifier, according to some example embodiments. The dynamic composite identifier system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the dynamic composite identifier system 124 may physically include an arrangement of one or more of the processors 310 (e.g., a subset of or among the one or more processors of the machine) configured to perform the operations described herein for that module. As another example, any module of the dynamic composite identifier system 124 may include software, hardware, or both, that configure an arrangement of one or more processors 310 (e.g., among the one or more processors of the machine) to perform the operations described herein for that module. Accordingly, different modules of the dynamic composite identifier system 124 may include and configure different arrangements of such processors 310 or a single arrangement of such processors 310 at different points in time. Moreover, any two or more modules of the dynamic composite identifier system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
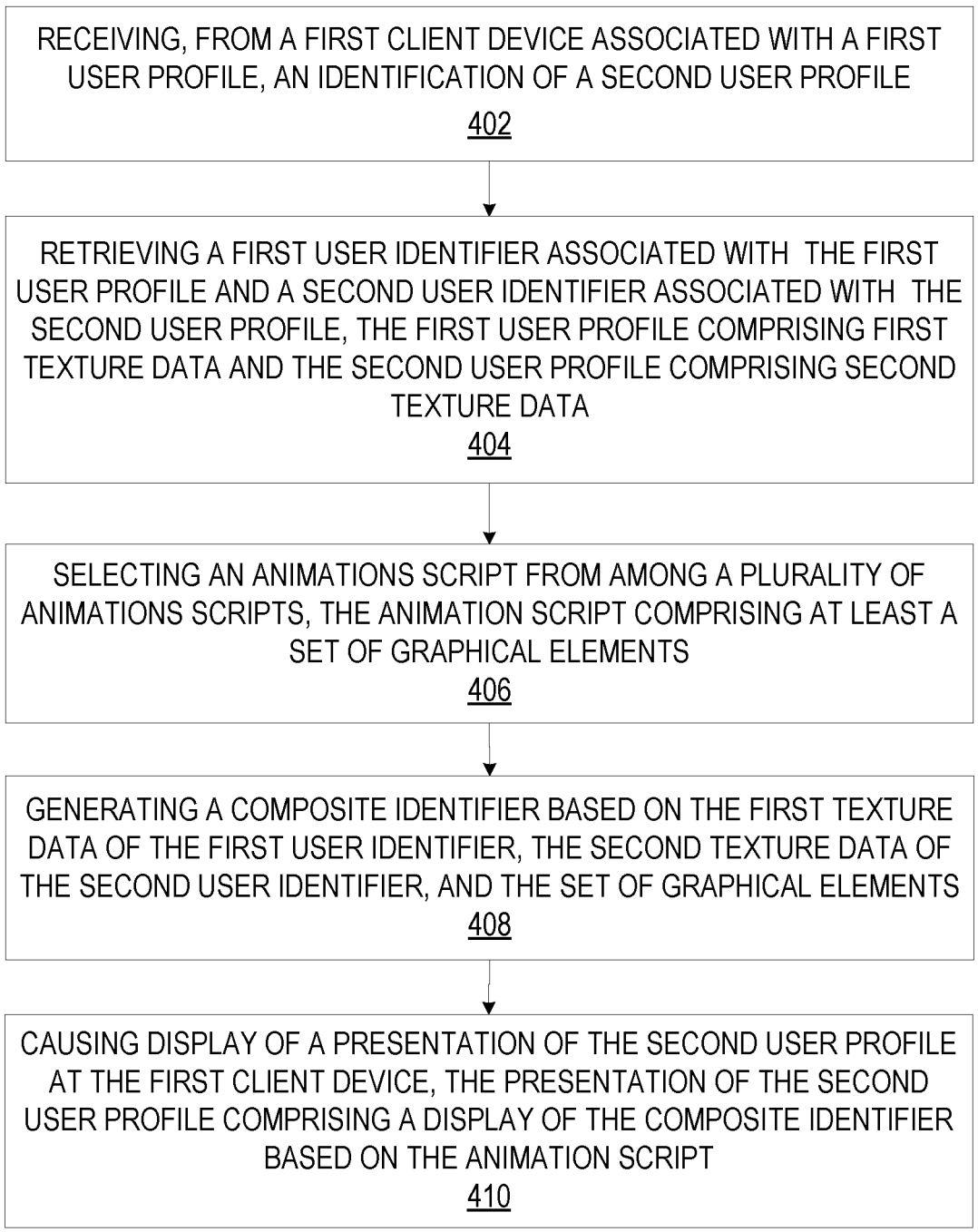
FIG. 4 is a flowchart illustrating a method for generating and causing display of a dynamic composite user identifier, according to certain example embodiments.

FIG. 4 is a flowchart illustrating a method 400 for generating and causing display of a composite user identifier, according to certain example embodiments. Operations of the method 400 may be performed by the modules described above with respect to FIG. 3. As shown in FIG. 4, the method 400 includes one or more operations 402, 404, 406, 408, and 410.

At operation 402, the user profile module 304 receives, from a client device 102, an identification of a second user profile. The client device may be associated with a first user profile. A user of the client device 102 may provide an input into a GUI that selects or otherwise identifies the second user profile. For example, the input may comprise a selection of a user identifier associated with the second user profile, or may comprise a text string that identifies the second user profile.

At operation 404, responsive to receiving the identification of the second user profile from the first user profile, the user profile module 304 retrieves a first user identifier associated with the first user profile and a second user identifier associated with the second user profile. For example, the user identifiers may include graphical avatars that comprise texture data that define display attributes of the graphical avatars.

At operation 406, the media module 306 selects an animation script from among a plurality of animation scripts, wherein the animation script includes a set of graphical elements. For example, the animation scripts may reside within the database 120. The dynamic composite identifier system 124 may access the database 120 through the database server 118.

At operation 408, the media module 306 generates a composite identifier based on texture data corresponding with the first user identifier, and the second user identifier, as well as with the set of graphical elements from the selected animation script. For example, as discussed above, the user identifiers may include graphical avatars such as Bitmoji. The composite identifier may therefore comprise a display of the corresponding graphical avatars, wherein the display is based on the animation script.

Figure 9:
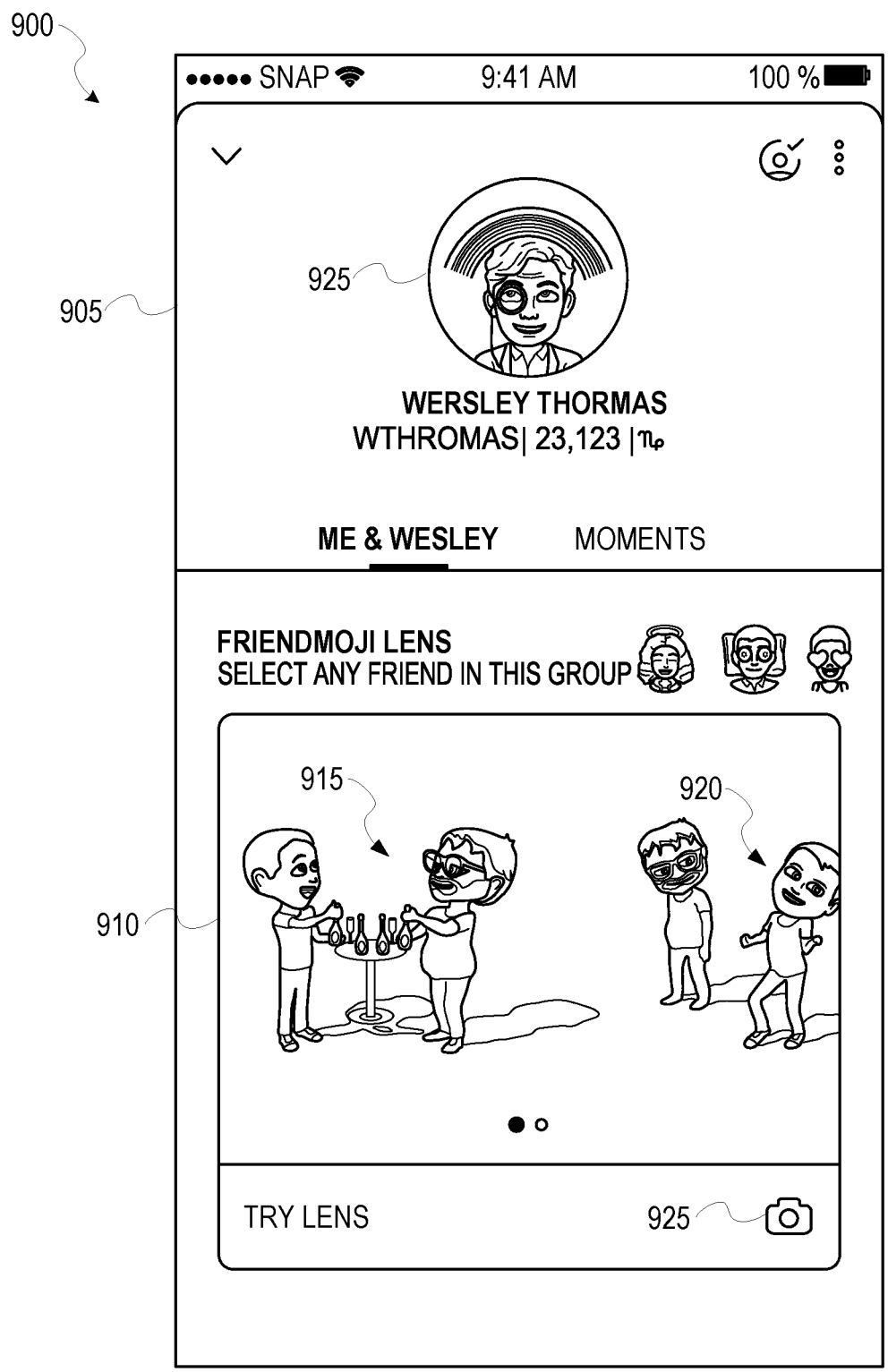
FIG. 9 is an interface diagram illustrating a presentation of a user profile that includes dynamic composite user identifiers, according to certain example embodiments.

At operation 410, the presentation module 302 generates and causes display of a presentation of a user profile of the second user at the client device 102 (responsive to the identification of the second user from the first user), wherein the presentation of the user profile includes a display of the composite identifier generated by the media module 306, at a position within the user profile, as seen in the interface diagram 900 depicted in FIG. 9.

Figure 5:
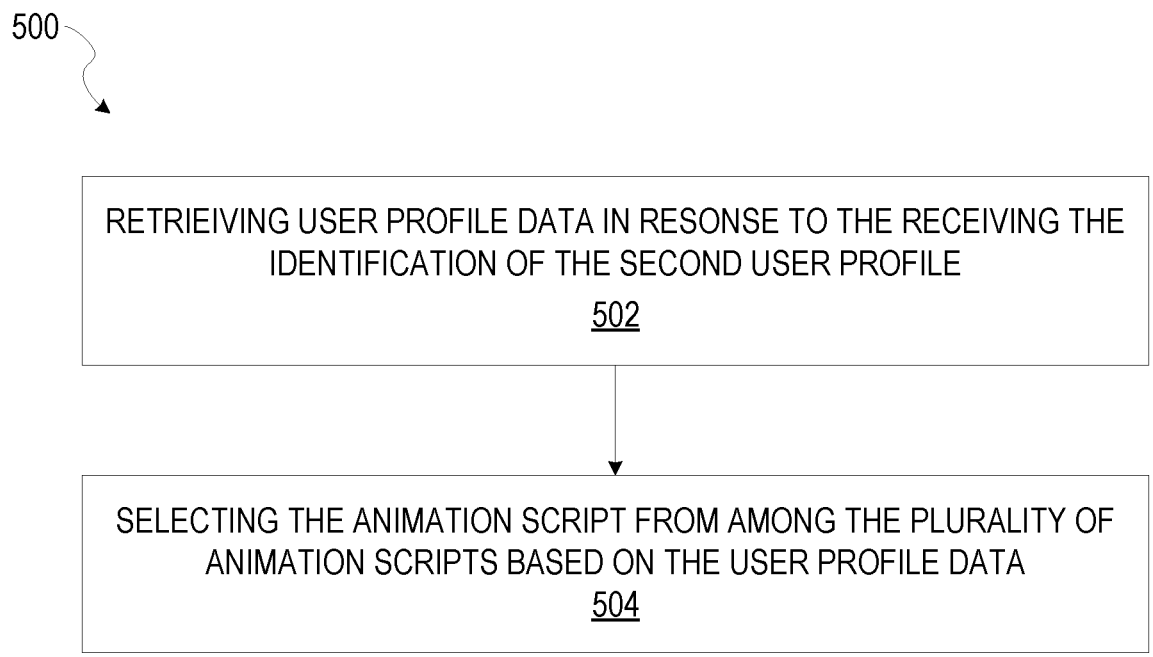
FIG. 5 is a flowchart illustrating a method for generating and causing display of a dynamic composite user identifier, according to certain example embodiments.

FIG. 5 is a flowchart illustrating a method 500 for generating and causing display of a dynamic composite user identifier, according to certain example embodiments. Operations of the method 500 may be performed by the modules described above with respect to FIG. 3. As shown in FIG. 5, the method 500 includes one or more operations 502, and 504, that may be performed as a part of (e.g., a subroutine) the method 400 depicted in FIG. 4.

At operation 502, the user profile module 304 retrieves user profile data associated with at least one of the first user profile and the second user profile responsive to receiving the identification of the second user profile from the first user profile. The user profile data may include user preferences, as well as a usage history of each of the animation scripts from among the plurality of animation scripts.

At operation 504, the media module 306 selects an animation script from among the plurality of animation scripts based on the user profile data. For example, the user profile data may include user preferences that identify one or more animation scripts from the plurality of animation scripts, or a usage history that indicates a number of times in which the first user or second user have accessed an animation script from the plurality of animation scripts.

In such embodiments, the media module 306 may rank the plurality of animation scripts within the database 120, and select a portion of the ranked plurality of animation scripts for display.

FIG. 6 is a flowchart illustrating a method 600 for generating and causing display of a dynamic composite user identifier, according to certain example embodiments. Operations of the method 600 may be performed by the modules described above with respect to FIG. 3. As shown in FIG. 6, the method 600 includes one or more operations 602, 604, and 606, that may be performed as a part of (e.g., a subroutine) the method 400 depicted in FIG. 4.

At operation 602, the user profile module 304 retrieves a chat history between the first user and the second user, responsive to receiving the identification of the second user profile from the first user profile. The chat history may for example comprise a chat transcript that includes messages which include graphical avatar animated based on one or more of the animation scripts from the plurality of animation scripts.

At operation 604, the media module 306 identifies a message from among the chat transcript that includes media content that comprises an animation script from the plurality of animation scripts. For example, the message may be a most recent message that includes media content sent between the first user profile and the second user profile.

At operation 606, the media module 306 selects an animation script from among the plurality of animation scripts based on the animation script identified among the chat history between the first user and the second user.

FIG. 7 is a flowchart illustrating a method 700 for generating and causing display of a dynamic composite user identifier, according to certain example embodiments. Operations of the method 700 may be performed by the modules described above with respect to FIG. 3. As shown in FIG. 7, the method 700 includes one or more operations 702, 704, that may be performed as a part of (e.g., a subroutine) the method 400 depicted in FIG. 4.

At operation 702, as in operation 410 of the method 400, and as seen in the interface diagram 900 depicted in FIG. 9, the presentation module 302 generates and causes display of a presentation of the user profile associated with the second user at the client device 102 responsive to receiving the identification of the second user profile from the first user profile. For example, the user profile (e.g., user profile 905 of FIG. 9) may include a display of the composite identifier at a position within the user profile displayed at the client device 102.

At operation 704, the media module 306 animates the composite identifier based on the selected animation script. For example, the media module 306 may loop the animation of the composite identifier as long as the composite identifier is visibly displayed at the client device 102, while in further embodiments the media module 306 may cause the composite identifier to perform the animation a single time, or responsive to a user input.

FIG. 8 is a diagram 800 illustrating a dynamic composite user identifier according to certain example embodiments, and as discussed in the method 400 of FIG. 4. The diagram 800 includes an illustration of a set of interface elements 805 to receive a user input 810 to identify a user profile, as discussed in operation 402 of the method 400.

For example, as seen in the diagram 800, the presentation module 302 may cause display of the set of interface elements 805 within a GUI of a client device 102. The set of interface elements 805 may comprise a display of one or more user identifiers associated with a set of users associated with a user of the client device 102 (e.g., a first user). The first user may provide the input 810 to select a user identifier from among the set of user identifiers displayed among the set of interface elements 805.

Responsive to receiving the selection 810, the dynamic composite identifier system 124 generates and causes display of the composite identifier 825, wherein the composite identifier 825 comprises at least a display of a first user identifier 815 associated with the first user, and a second user identifier 820 associated with the second user, and wherein attributes of the composite identifier 825 are based on a selection of an animation script, as discussed in operations of the methods 400, 500, 600, and 700. For example, as seen in the diagram 800, the composite identifier 825 comprises a display of the corresponding user identifiers of the first user and the second user, animated to perform an action or behavior based on the selected animation script (e.g., shaking bottles of apple cider).

FIG. 9 is an interface diagram 900 depicting a presentation of a user profile 905 that includes a dynamic composite identifiers 915 and 920, according to certain example embodiments. As seen in FIG. 9, the user profile 905 may be associated with a user (e.g., the second user of the method 400) depicted by the user identifier 925.

According to embodiments discussed herein, the user profile 905 may be displayed at a client device 102 associated with the first user. Responsive to receiving an identification of the second user (e.g., the user depicted by the user identifier 925) from the first user, the dynamic composite identifier system 124 generates and causes display of the user profile 905 associated with the second user, wherein the user profile 905 includes a display of the composite identifiers 915 and 920, and wherein the composite identifiers 915 and 920 comprise the user identifier 925 (of the second user) as well as a user identifier associated with the user operating the client device 102 (e.g., the first user discussed in the method 400).

As seen in the interface diagram 900, the composite identifiers 915 and 920 may be displayed within the region 910 of the user profile 905. For example, the region 910 may comprise a display of a set of composite identifiers, generated based on a set of animation scripts, which are curated based on user profile data of the first user and the second user.

The user profile 905 may also include a graphical icon 925. In response to receiving a selection of the graphical icon 925, the communication module 308 may provide one or more interfaces to generate messages that include one or more of the composite identifiers presented within the region 910, such as the composite identifiers 915 and 920.

Software Architecture

Figure 10:
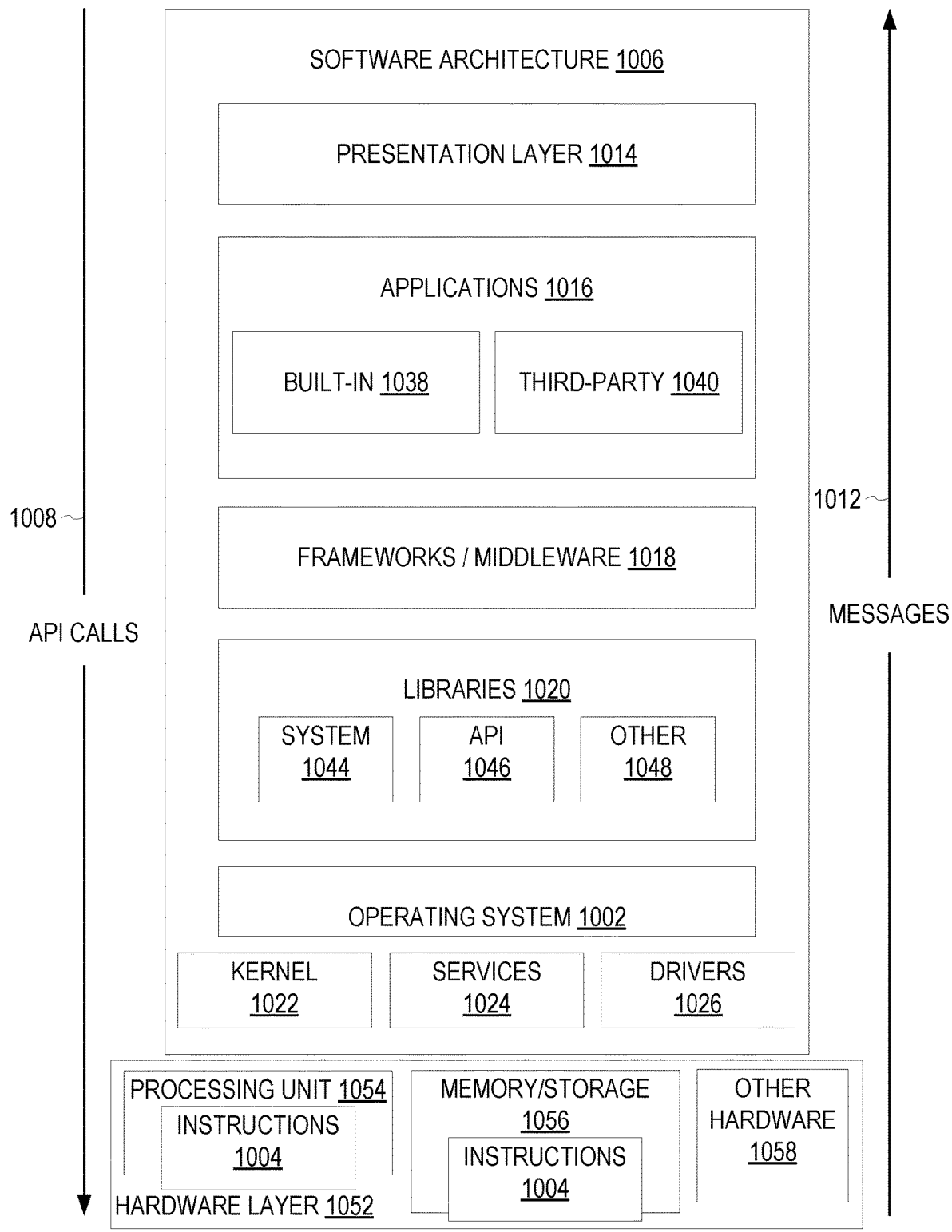
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as the machine 1100 of FIG. 11 that includes, among other things, processors 1104, memory 1114, and I/O components 1118. A representative hardware layer 1052 is illustrated and can represent, for example, the machine 1000 of FIG. 10. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
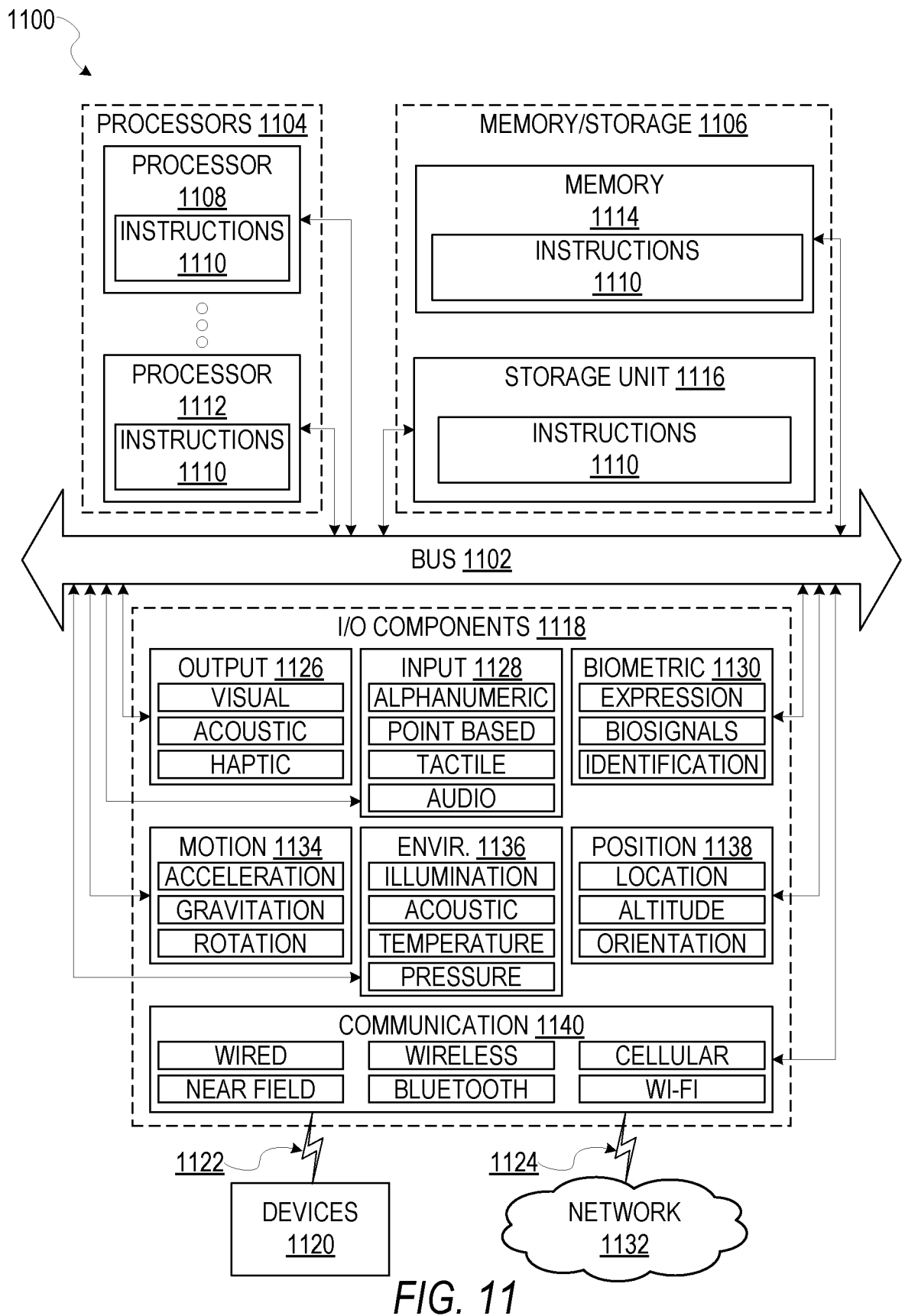
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
accessing a chat history between a first user account and a second user account, the chat history comprising a set of messages;
ranking plurality of media items based on the set of messages of the chat history, the plurality of media items including at least a media item;
selecting the media item from among the plurality of media items based on the ranking; and
generating a composite identifier based on a first user identifier associated with the first user account, a second user identifier associated with the second user account, and the media item.

2. The method of claim 1, wherein the first user identifier includes a first graphical avatar and the second user identifier includes a second graphical avatar.

3. The method of claim 2, wherein the media item includes an animation script that comprises a set of instructions, and the generating the composite identifier includes:
generating the composite identifier based on the first graphical avatar, the second graphical avatar, and the set of instructions of the animation script.

4. The method of claim 1, wherein the method further comprises:
generating a message that includes the composite identifier, the message including an ephemeral message that comprises a display duration.

5. The method of claim 1, wherein the accessing the chat history between the first user account and the second user account includes:
causing display of a set of user identifiers at a client device associated with the first user account, the set of user identifiers including the second user identifier;
receiving an input that selects the second user identifier from among the set of user identifiers; and
accessing the chat history between the first user account and the second user account in response to the input that selects the second user identifier.

6. The method of claim 1, wherein the first user identifier comprises a first set of display attributes, the second user identifier comprises a second set of display attributes, the media item comprises an animation script, and the method further comprises:
animating the composite identifier that comprises first set of display attributes and the second set of display attributes based on the animation script.

7. The method of claim 1, wherein the ranking the media item among the plurality of media items is based on a usage history associated with the media item.

8. A system comprising:
a memory; and
at least one hardware processor coupled to the memory and comprising instructions that causes the system to perform operations comprising:
accessing a chat history between a first user account and a second user account, the chat history comprising a set of messages;
ranking plurality of media items based on the set of messages of the chat history, the plurality of media items including at least a media item;
selecting the media item from among the plurality of media items based on the ranking; and
generating a composite identifier based on a first user identifier associated with the first user account, a second user identifier associated with the second user account, and the media item.

9. The system of claim 8, wherein the first user identifier includes a first graphical avatar and the second user identifier includes a second graphical avatar.

10. The system of claim 9, wherein the media item includes an animation script that comprises a set of instructions, and the generating the composite identifier includes:
generating the composite identifier based on the first graphical avatar, the second graphical avatar, and the set of instructions of the animation script.

11. The system of claim 8, wherein the operations further comprise:
generating a message that includes the composite identifier, the message including an ephemeral message that comprises a display duration.

12. The system of claim 8, wherein the accessing the chat history between the first user account and the second user account includes:
causing display of a set of user identifiers at a client device associated with the first user account, the set of user identifiers including the second user identifier;
receiving an input that selects the second user identifier from among the set of user identifiers; and
accessing the chat history between the first user account and the second user account in response to the input that selects the second user identifier.

13. The system of claim 8, wherein the first user identifier comprises a first set of display attributes, the second user identifier comprises a second set of display attributes, the media item comprises an animation script, and the operations further comprise:
animating the composite identifier that comprises first set of display attributes and the second set of display attributes based on the animation script.

14. The system of claim 8, wherein the ranking the media item among the plurality of media items is based on a usage history associated with the media item.

15. A non-transitory machine-readable storage medium comprising instructions that, when executed by one or more processors of a machine, cause the machine to perform operations comprising:
accessing a chat history between a first user account and a second user account, the chat history comprising a set of messages;
ranking plurality of media items based on the set of messages of the chat history, the plurality of media items including at least a media item;
selecting the media item from among the plurality of media items based on the ranking; and
generating a composite identifier based on a first user identifier associated with the first user account, a second user identifier associated with the second user account, and the media item.

16. The non-transitory machine-readable storage medium of claim 15, wherein the first user identifier includes a first graphical avatar and the second user identifier includes a second graphical avatar.

17. The non-transitory machine-readable storage medium of claim 16, wherein the media item includes an animation script that comprises a set of instructions, and the generating the composite identifier includes:

generating the composite identifier based on the first graphical avatar, the second graphical avatar, and the set of instructions of the animation script.

18. The non-transitory machine-readable storage medium of claim 15, wherein the operations further comprise:

generating a message that includes the composite identifier, the message including an ephemeral message that comprises a display duration.

19. The non-transitory machine-readable storage medium of claim 15, wherein the accessing the chat history between the first user account and the second user account includes:

causing display of a set of user identifiers at a client device associated with the first user account, the set of user identifiers including the second user identifier;

receiving an input that selects the second user identifier from among the set of user identifiers; and accessing the chat history between the first user account and the second user account in response to the input that selects the second user identifier.

20. The non-transitory machine-readable storage medium of claim 15, wherein the first user identifier comprises a first set of display attributes, the second user identifier comprises a second set of display attributes, the media item comprises an animation script, and the operations further comprise:

animating the composite identifier that comprises first set of display attributes and the second set of display attributes based on the animation script.

* * * * *